US007104279B2

(12) United States Patent
Raftis et al.

(10) Patent No.: US 7,104,279 B2
(45) Date of Patent: Sep. 12, 2006

(54) METHOD AND APPARATUS FOR PREVENTING STAGNATION IN FLUID RESERVOIRS

(75) Inventors: Spiros G. Raftis, Pittsburgh, PA (US); Michael J. Duer, Zelienople, PA (US)

(73) Assignee: Red Valve Co., Inc., Carnegie, PA (US)

( * ) Notice: Subject to any disclaimer, the term of this patent is extended or adjusted under 35 U.S.C. 154(b) by 61 days.

(21) Appl. No.: 10/296,001

(22) PCT Filed: May 30, 2001

(86) PCT No.: PCT/US01/17378

§ 371 (c)(1),
(2), (4) Date: Nov. 20, 2002

(87) PCT Pub. No.: WO01/92652

PCT Pub. Date: Dec. 6, 2001

(65) Prior Publication Data

US 2003/0205277 A1    Nov. 6, 2003

(51) Int. Cl.
*E03B 11/12* (2006.01)
*F16K 15/14* (2006.01)

(52) U.S. Cl. .................................. 137/592; 137/846
(58) Field of Classification Search ........... 137/1, 137/512.1, 588, 590, 592, 846; 366/131, 366/134, 136, 137, 173.1, 173.2, 177.1, 182.1, 366/182.2, 182.4, 192
See application file for complete search history.

(56) References Cited

U.S. PATENT DOCUMENTS

| | | | | |
|---|---|---|---|---|
| 1,813,827 A | * | 7/1931 | Swearingen | ............... 137/592 |
| 2,128,617 A | * | 8/1938 | Lawlor | ..................... 137/592 |
| 2,217,582 A | * | 10/1940 | White | ......................... 137/590 |
| 3,084,472 A | * | 4/1963 | Feik | ........................... 137/592 |
| 4,013,556 A | | 3/1977 | Evans | |
| 4,212,308 A | * | 7/1980 | Percarpio | ................. 137/512.1 |
| 5,066,393 A | * | 11/1991 | Padera et al. | ............... 137/590 |
| 5,352,356 A | | 10/1994 | Murphy | |
| 5,735,600 A | | 4/1998 | Wyness et al. | |
| 6,016,839 A | | 1/2000 | Raftis et al. | |
| 6,237,629 B1 | * | 5/2001 | Zelch | ........................ 137/592 |

FOREIGN PATENT DOCUMENTS

DE    1 029 302    4/1958
JP    1-111696    4/1989

* cited by examiner

*Primary Examiner*—John Rivell
(74) *Attorney, Agent, or Firm*—The Webb Law Firm

(57) ABSTRACT

An apparatus (16) for preventing stagnation in a fluid reservoir (2) comprised of: an inlet/outlet conduit (6); a manifold (8), which communicates the inlet/outlet conduit (6) to inlet check valves (10) and outlet check valves (12); the inlet check valves (10) being positioned on the manifold (8) and being oriented such that a fluid (14) will flow from the manifold (8) through the inlet check valves (10) to the reservoir (2) during reservoir filling and fluid flow is prevented through the inlet check valves (10) during reservoir draining; and the outlet check valves (12) being positioned on the manifold (8) and spaced from the inlet check valves (10) to provide fluid flow within the reservoir (2) in the general direction from the inlet check valves (10) to the outlet check valves (12), the outlet check valves (12) being oriented such that fluid flows from the reservoir (2) through the outlet check valves (12) into the manifold (8) during reservoir draining and fluid flow through the outlet check valves (12) is prevented during reservoir filling.

15 Claims, 5 Drawing Sheets

METHOD AND APPARATUS FOR PREVENTING STAGNATION IN FLUID RESERVOIRS

BACKGROUND OF THE INVENTION

1. Field of the Invention

The present invention relates to systems for preventing the stagnation of fluids stored in large reservoirs.

2. Description of the Prior Art

Fluid reservoirs, particularly those used to store potable water, have historically had to contend with stagnation problems. Stagnation in such conventional potable water reservoir systems is a function of the size of the reservoir and, in particular, the relative dimensions of the cross-sectional area of the reservoir in plan view coupled with the number and location of inlet and outlet pipes. Conventional reservoirs are typically filled and drained from a single pipe located at one end of the reservoir. Filling and draining fluids through such a single pipe or conduit creates very little turbulence, particularly in areas within the reservoir remote from the inlet/outlet conduit.

In potable water reservoirs, water may not mix or be "turned over" in those areas remote from the inlet/outlet conduit. This is referred to as stagnant water. Potable water is typically "chlorinated" through the addition of hypochlorite or "chlorine" as a disinfectant to prevent microbial growth in the water. The chlorine concentration will decrease in stagnant water over time, resulting in unsanitary water quality if a sufficient degree of mixing between influent water and reservoir water is not maintained.

To a large extent, the fluid added to a reservoir through a single inlet/outlet conduit remains near the single pipe and is removed first during drainage operations, while the fluid previously in the reservoir remains. This phenomenon is generally referred to as "short-circuiting." Short-circuiting is the continual recirculation of the freshest water near the inlet/outlet conduit. Water outside of this area of influence becomes stagnant and loses disinfectant residual.

The prior art recognizes that the use of a plurality of inlet and outlet pipes would increase the mixing of fluids stored in reservoirs. However, the retrofitting of existing reservoirs to include additional inlet and outlet conduits can be quite expensive. The prior art also recognizes the use of reservoirs having a circular cross-section in plan view in an attempt to increase fluid mixing and eliminate "dead zones" that typically occur in the remote corners of reservoirs having rectangular cross-sections. However, fluid stagnation problems can still exist even if these improvements are deployed in conventional reservoir systems.

U.S. Pat. No. 6,016,839 to Raftis et al. discloses an air diffuser system for use in wastewater treatment that includes a manifold and a plurality of elastomeric "duckbill" check valves. The purpose of the air diffuser system is to inject and diffuse one process fluid into another process fluid for the purpose of aeration, diffusion, agitation, or mixing. The system is particularly well suited for activated sludge applications. However, the system does not employ duckbill check valves oriented to allow fluid to drain from the reservoir into the same manifold and inlet conduit by which it entered. Moreover, the Raftis et al. patent specifically discloses the benefits of using such "duckbill" check valves to prevent fluids stored within a reservoir from reaching the manifold.

There remains a need for an apparatus to minimize or eliminate short-circuiting, "dead zones," and/or stagnant areas in large, fluid-containing reservoirs, especially where the reservoirs contain potable water.

SUMMARY OF THE INVENTION

The present invention provides a system that can be installed in or retrofitted to conventional fluid reservoir systems, which includes a manifold conduit in combination with check valves to encourage crossflow and mixing of fluids stored within the reservoir to reduce, minimize, or eliminate stagnation of the fluid. These anti-stagnation systems can be deployed in reservoirs of any plan view, cross-sectional shape by adapting the shape of the manifold to the particular shape of the reservoir in which the system is to be installed. Anti-stagnation systems, according to the present invention, are less expensive than retrofitting existing reservoirs with multiple inlet and outlet conduits.

The apparatus for preventing stagnation in a fluid reservoir of the present invention is comprised of: an inlet/outlet conduit; a manifold which communicates the inlet/outlet conduit to inlet check valves and outlet check valves, the inlet check valves being positioned on the manifold and being oriented such that a fluid will flow from the manifold through the inlet check valves to the reservoir during reservoir filling, and fluid flow is prevented through the inlet check valves during reservoir draining, and the outlet check valves being positioned on the manifold and spaced from the inlet check valves to provide fluid flow within the reservoir in the general direction from the inlet check valves to the outlet check valves, the outlet check valves being oriented such that fluid flows from the reservoir through the outlet check valves into the manifold during reservoir draining, and fluid flow through the outlet check valves is prevented during reservoir filling.

The present invention is also directed to a method of preventing stagnation in fluid reservoirs. The method generally involves the steps of: introducing an influent liquid, typically potable water, process water, or wastewater, to a filling area of a reservoir for storing liquids; withdrawing the liquid from a draining area of the reservoir for storing liquids, wherein the draining area is remotely located from the filling area, such that the influent liquid mixes with the liquid in the reservoir and the liquid in the reservoir generally flows from the filling area to the draining area; and expelling the liquid from the draining area.

DETAILED DESCRIPTION OF THE PREFERRED EMBODIMENT

Figure 1:
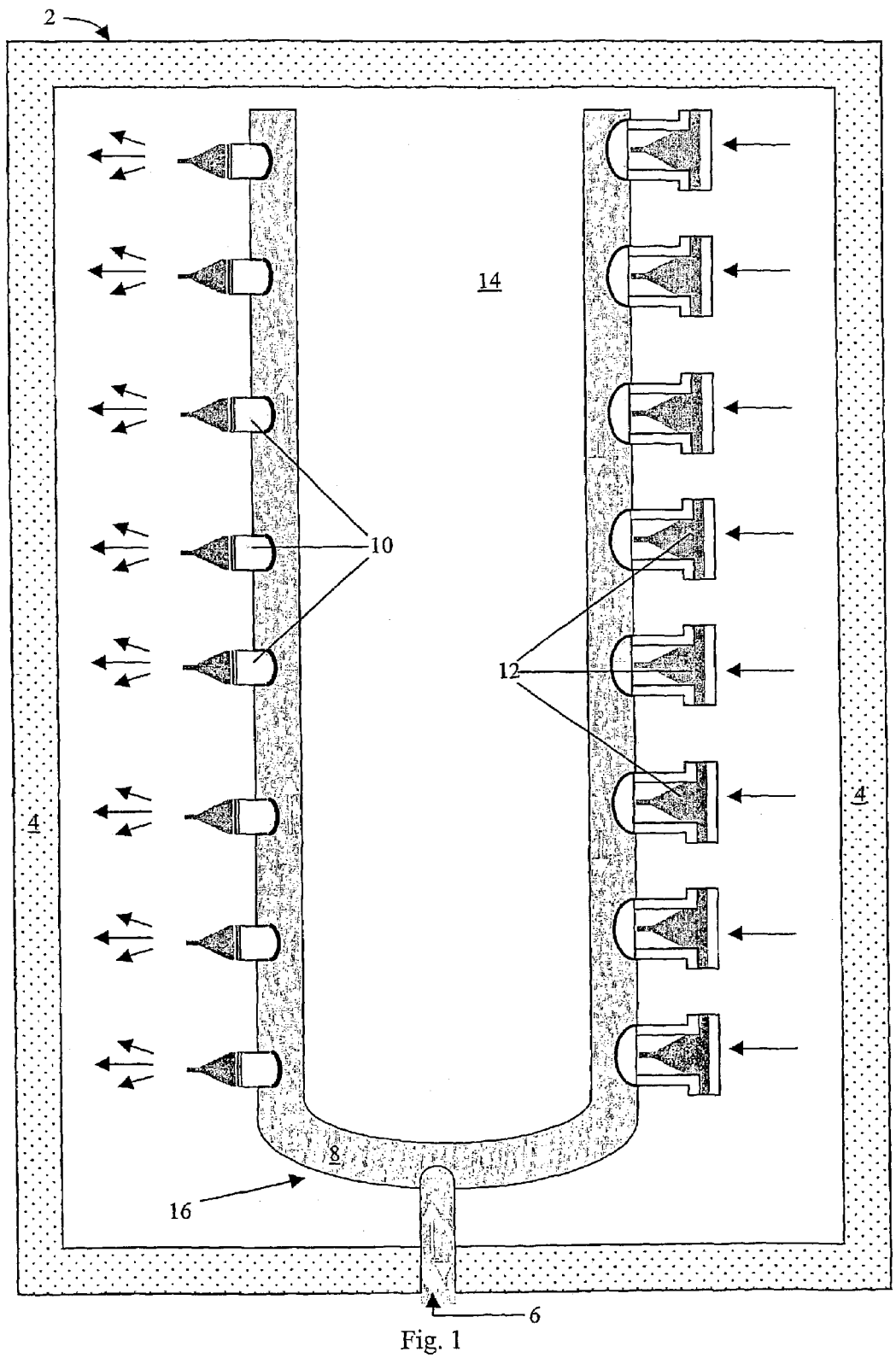
FIG. 1 shows a plan view of a rectangular fluid reservoir having a single inlet/outlet conduit with a U-shaped anti-stagnation system according to the present invention.

For the purpose of the description hereinafter, the terms "upper," "lower," "right," "left," "vertical," "horizontal," "top," "bottom," and derivatives thereof, shall relate to the invention as oriented in the drawing Figures. However, it is to be understood that the invention may assume alternate variations and step sequences except where expressly specified to the contrary. It is also to be understood that the specific devices and processes, illustrated in the attached drawings and described in the following specification, is an exemplary embodiment of the present invention. Hence, specific dimensions and other physical characteristics related to the embodiment disclosed herein are not to be considered as limiting the invention.

FIG. 1 shows a plan view of a U-shaped anti-stagnation apparatus 16 within a fluid reservoir 2 of rectangular shape. A fluid 14, typically potable water, process water, or wastewater, enters and exits (sequentially, not simultaneously) fluid reservoir 2 by way of an inlet/outlet conduit 6. The fluid 14 is retained within fluid reservoir 2 by a fluid reservoir wall 4. The fluid reservoir 2 is filled by pumping fluid 14 into inlet/outlet conduit 6. Fluid 14 flows through inlet/outlet conduit 6 and into a manifold 8, which is connected thereto. The fluid 14 travels along manifold 8 to one or more inlet check valves 10, which are preferably a duckbill-type check valve, and from there into fluid reservoir 2 for mixing and storage. The preferred duckbill inlet check valves 10 are constructed to perform as both non-return valves and nozzles that increase fluid velocity and enhance the turbulence of mixing of the fluid 14 within fluid reservoir 2. The duckbill check valves 10 are typically of an elastomeric composition, which reduces maintenance costs related to the use of the anti-stagnation apparatus 16 of the present invention.

While fluid may flow through manifold 8 to one or more outlet check valves 12, the fluid 14 is prevented from flowing through outlet check valve 12 and into fluid reservoir 2 because of the non-return nature and orientation of outlet check valve 12.

Draining of fluid reservoir 2 occurs when the hydraulic pressure of the fluid 14, within fluid reservoir 2, is greater than the pressure of the fluid 14 within manifold 8. Under such circumstances, fluid 14 flows from fluid reservoir 2 through one or more outlet check valves 12 into manifold 8, which is connected to inlet/outlet conduit 6. It is preferred that outlet check valve 12 be a duckbill-type check valve. The duckbill check valves 12 are typically of an elastomeric composition as described above.

Accordingly, anti-stagnation apparatus 16 can be connected to a single existing inlet/outlet conduit 6 and promotes the thorough mixing of the fluid 14 contained within fluid reservoir 2 by significantly increasing the number of locations within fluid reservoir 2 at which fluid 14 enters and exits the fluid reservoir 2, and by increasing the velocity by which fluid 14 enters the fluid reservoir 2. By tailoring the number and spacial orientation of inlet check valves 10 and outlet check valves 12, fluid 14 is forced to travel throughout fluid reservoir 2 during the course of operating the reservoir 2 for its intended purpose. By using anti-stagnation apparatus 16, thorough mixing occurs, eliminating (or at least reducing the number of) "dead zones" in areas remote from a single inlet/outlet conduit 6.

Figure 2:
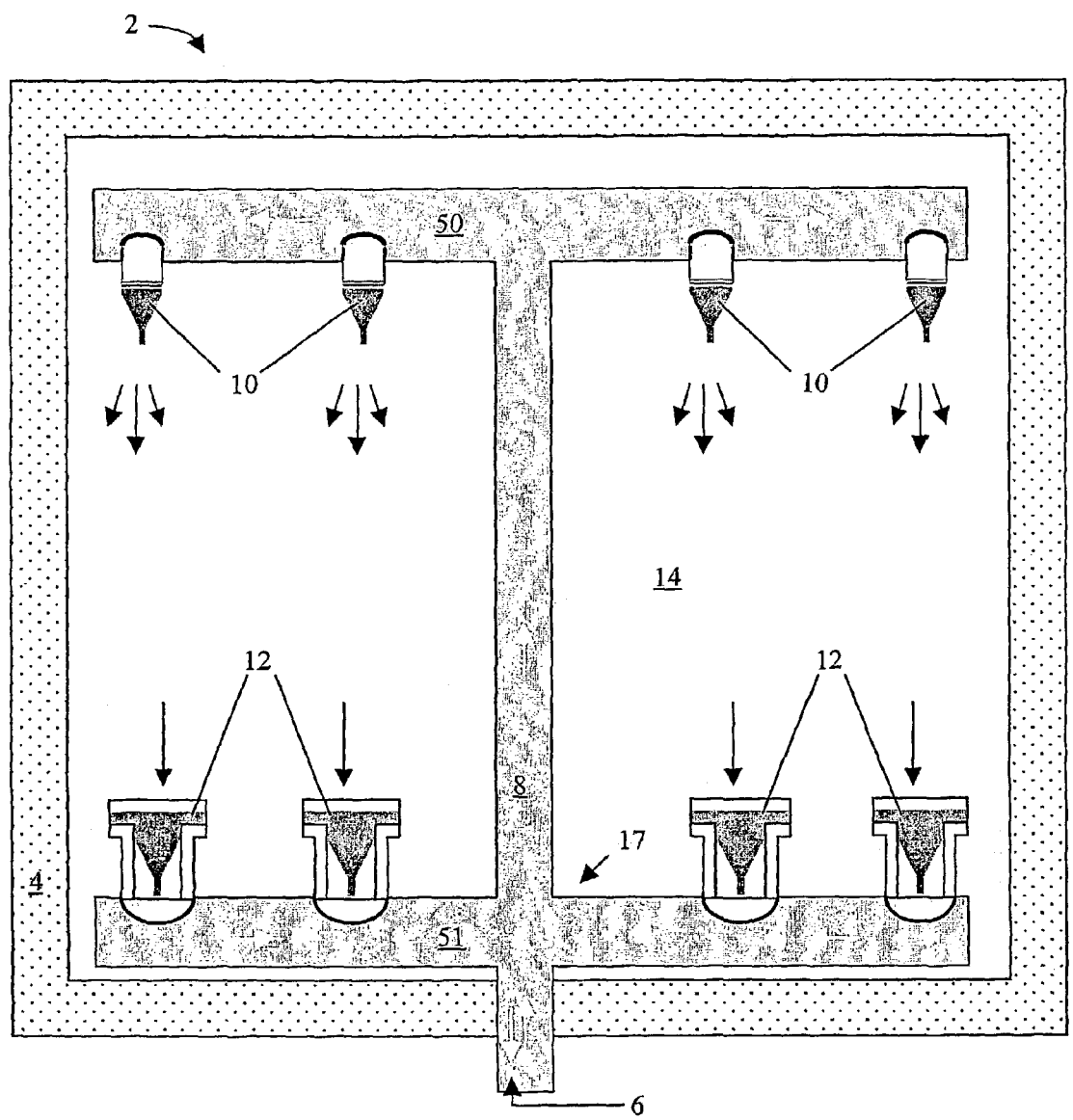
FIG. 2 shows a plan view of a rectangular fluid reservoir having a single inlet/outlet conduit with an I-shaped anti-stagnation system according to the present invention.

Similarly, FIG. 2 shows an I-shaped shaped anti-stagnation apparatus 17 within a fluid reservoir 2 of rectangular shape. Operation of I-shaped anti-stagnation apparatus 17 is similar to that described for U-shaped anti-stagnation apparatus 16. Filing is accomplished as fluid 14 enters inlet/outlet conduit 6, traverses manifold 8 and enters reservoir 2 via inlet check valves 10 aligned along far branch 50 of manifold 8. Draining is accomplished as fluid 14 enters outlet check valves 12, flows through near branch 51 and exits manifold 8 through inlet/outlet conduit 6.

Figure 3:
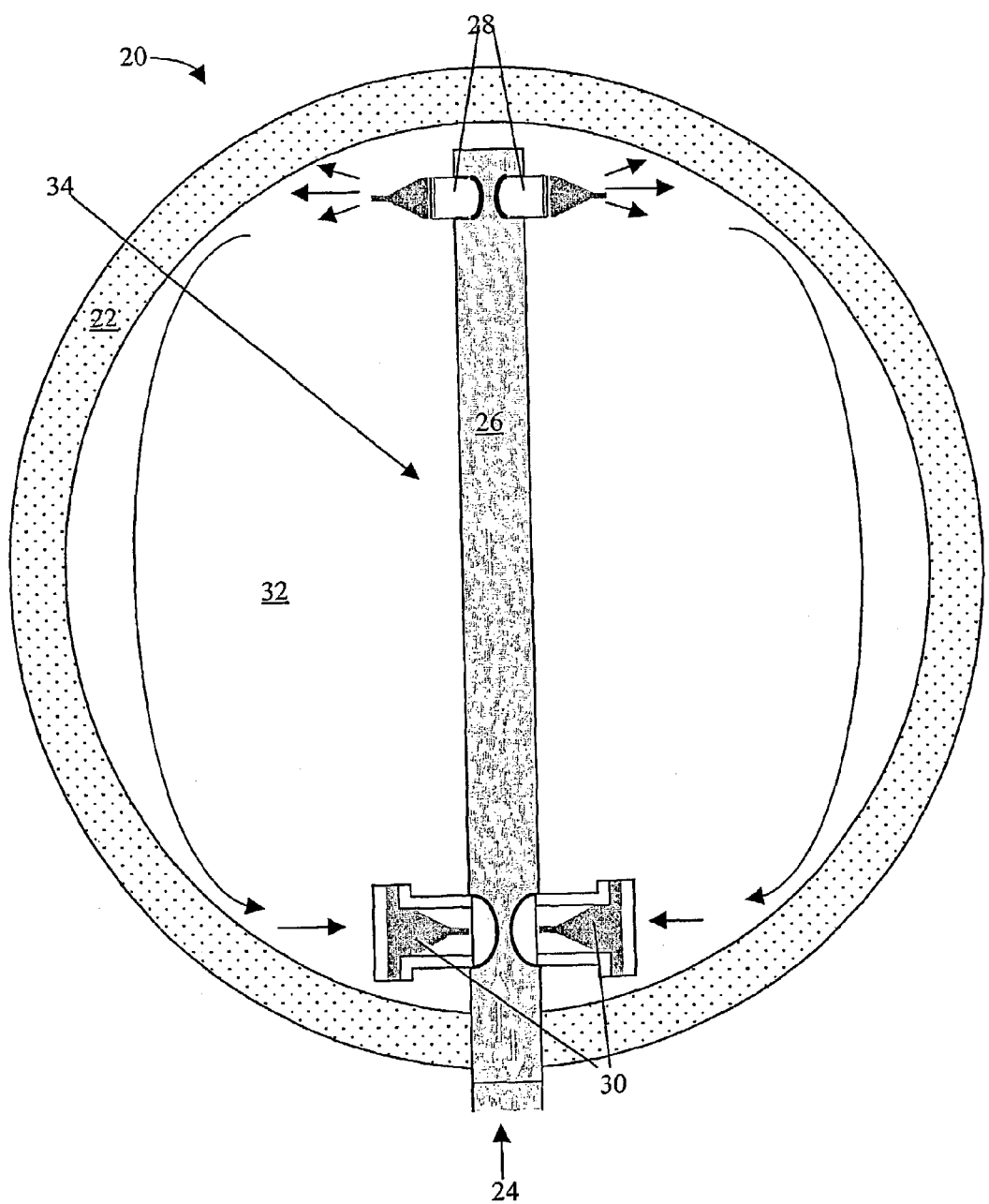
FIG. 3 shows a plan view of a fluid reservoir of a circular cross-section having a single inlet/outlet conduit with a horizontal anti-stagnation system according present to the invention.

FIG. 3 shows a plan view of a second fluid reservoir 20 having a circular cross-section. Fluid 32 is contained within second fluid reservoir 20 by second fluid reservoir wall 22 and enters and exits second fluid reservoir 20 via inlet/outlet conduit 24. Horizontal anti-stagnation apparatus 34 is shown connected to inlet/outlet conduit 24. Anti-stagnation apparatus 34 consists of manifold 26, one or more inlet check valves 28 and one or more outlet check valves 30.

To fill second fluid reservoir 20, fluid 32 is pumped into inlet/outlet conduit 24. Fluid 32 flows through inlet/outlet conduit 24 and into manifold 26. Fluid flows from manifold 26 and into second fluid reservoir 20 through one or more inlet check valves 28. Inlet check valves 28 provide two functions. First, inlet check valves 28 act as non-return valves. Second, inlet check valves 28 increase the velocity of fluid 32 exiting inlet check valves 28 into second fluid reservoir 20. Inlet check valves 28 are preferably a duckbill-type check valve. The non-return nature of outlet check valves 30 prevents fluid 32 from flowing through manifold 26 and into second fluid reservoir 20 by way of outlet check valves 30.

Second fluid reservoir 20 is drained when the hydraulic pressure within second fluid reservoir 20 is greater than the fluid pressure within manifold 26. Under such conditions, fluid 32 flows from second fluid reservoir 20 through one or more outlet check valves 30 into manifold 26, which is connected to inlet/outlet conduit 24. The non-return nature of inlet check valves 28 prevents fluid from flowing from second fluid reservoir 20 into manifold 26 through inlet check valves 28 during draining of second fluid reservoir 20. Outlet check valves 30 are preferably duckbill-type check valves.

When using anti-stagnation apparatus 34, fluid 32 becomes thoroughly mixed within second fluid reservoir 20 because of the number of locations through which fluid can enter or exit second fluid reservoir 20 and the relationship between the locations of one or more inlet check valves 28, one or more outlet check valves 30, and the cross-sectional shape of second fluid reservoir 20. The advantageous mixing is achieved while continuing to use only one inlet/outlet conduit 24 on fluid reservoir 20.

Figure 4:
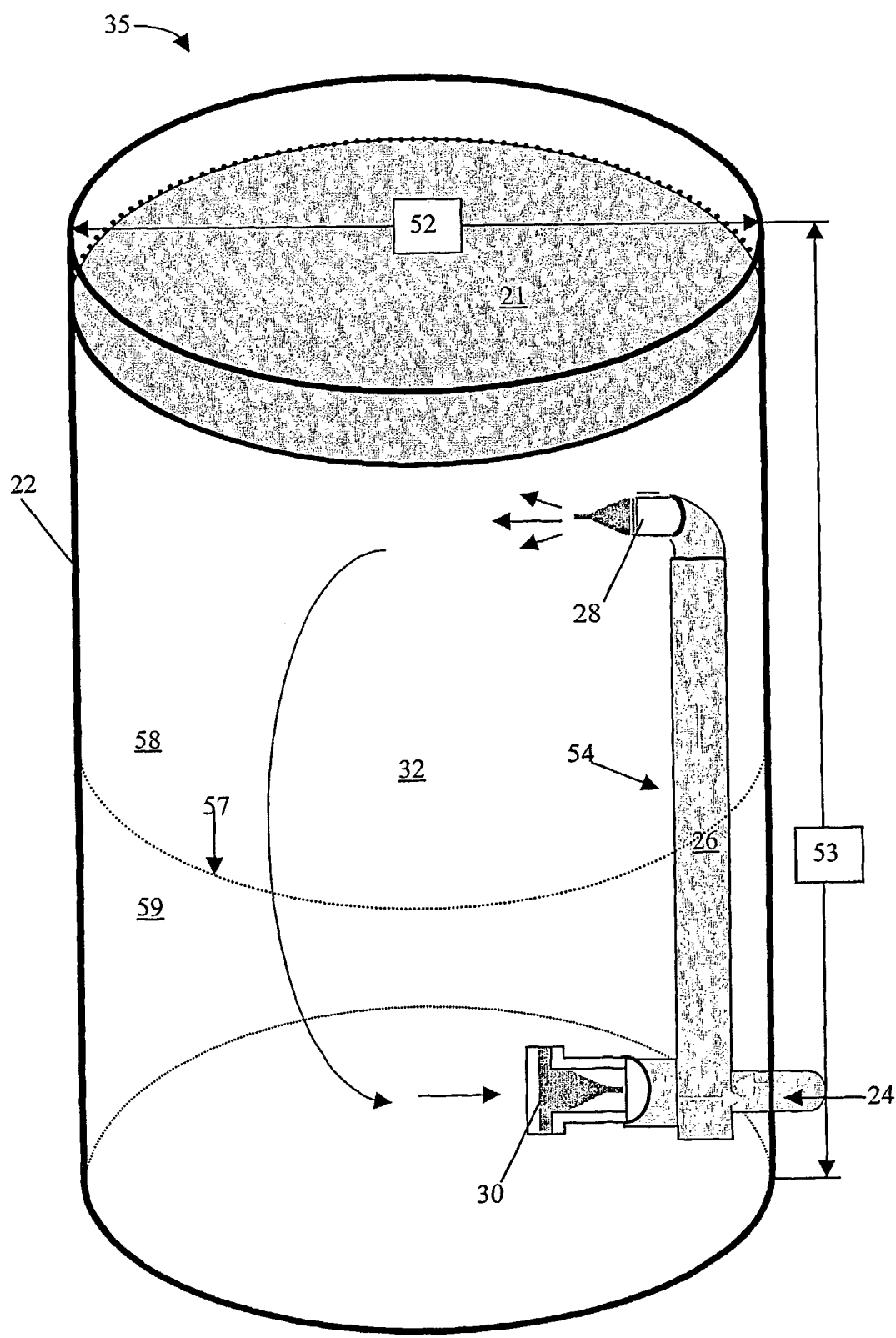
FIG. 4 shows a perspective view of a standpipe fluid reservoir of a circular cross-section having a single inlet/outlet conduit with a vertical anti-stagnation system according to the invention.

FIG. 4 shows a standpipe fluid reservoir 35, which includes a vertical anti-stagnation apparatus 54. Fluid 32 is contained within standpipe fluid reservoir 35 by fluid reservoir wall 22 and enters and exits standpipe fluid reservoir 35 via inlet/outlet conduit 24. Vertical anti-stagnation apparatus 54 is shown connected to inlet/outlet conduit 24. Vertical anti-stagnation apparatus 54 consists of manifold 26, one or more inlet check valves 28, and one or more outlet check valves 30.

To fill standpipe fluid reservoir 35, fluid 32 is pumped into inlet/outlet conduit 24. Fluid 32 flows through inlet/outlet conduit 24 and into manifold 26. A dividing line 57 is an imaginary line separating standpipe fluid reservoir 35 into an upper half 58 and a lower half 59. Fluid flows from manifold 26 and into standpipe fluid reservoir 35 through one or more inlet check valves 28. Inlet check valves 28 are located in upper half 58 of standpipe fluid reservoir 35.

Standpipe fluid reservoir 35 is drained when fluid 32 flows through one or more outlet check valves 30 into manifold 26, which is connected to inlet/outlet conduit 24. Outlet check valves 30 are located in lower half 59 of standpipe fluid reservoir 35. Overall operation of standpipe fluid reservoir 35 is similar to second fluid reservoir 20.

In general, the use of a horizontal anti-stagnation apparatus, such as those depicted in FIGS. 1, 2, and 3 (anti-stagnation apparatuses 16, 17, and 34), instead of vertical anti-stagnation apparatus 54 will be determined depending on the surface area or diameter 52 (FIG. 4) compared to the height 53 of a fluid reservoir. When the surface area and/or diameter compared to the height of a fluid reservoir is large, then a horizontal anti-stagnation apparatus will be used, as this design will provide better stagnation prevention (side to side mixing). When the surface area and/or diameter compared to the height of a fluid reservoir is small (as in a standpipe), then a vertical anti-stagnation apparatus will be used, as this design will provide better stagnation prevention (top to bottom mixing).

A horizontal anti-stagnation apparatus 34 will typically be used when the ratio of the surface area 52 to the height 53 of the fluid reservoir 22 is greater than 2. In this situation, the apparatus for preventing stagnation 34 is in a horizontal configuration where the inlet/outlet conduit 24, the manifold 26, the inlet check valves 28, and the outlet check valves 30 are approximately in a plane parallel to fluid surface 21.

A vertical anti-stagnation apparatus 54 will typically be used when the ratio of the surface area 52 to the height 53 of the fluid reservoir is less than 1. In this situation, the apparatus for preventing stagnation 54 is in a vertical configuration where the inlet/outlet conduit 24, the manifold 26, the inlet check valves 28, and the outlet check valves 30 are approximately in a plane perpendicular to the fluid surface 21. Generally, the inlet check valves 28 will be located in the upper half 58 of the fluid reservoir 22, and the outlet check valves 30 will be located in the lower half 59 of the fluid reservoir 22.

Figure 5:
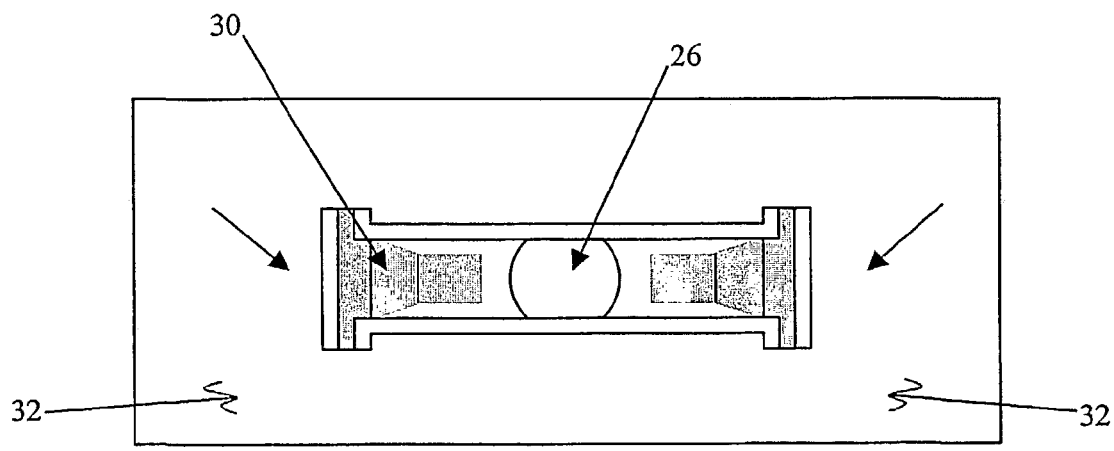
FIG. 5 shows a front elevational view of two outlet duckbill check valves according to the present invention.

FIG. 5 shows a pair of the preferred outlet duckbill check valves 30, directed into manifold 26 of FIG. 2. As indicated by the arrows, fluid 32 enters outlet duckbill check valves 30 and flows into manifold 26 during draining operations of second fluid reservoir 20, as depicted in FIG. 2.

Figure 6:
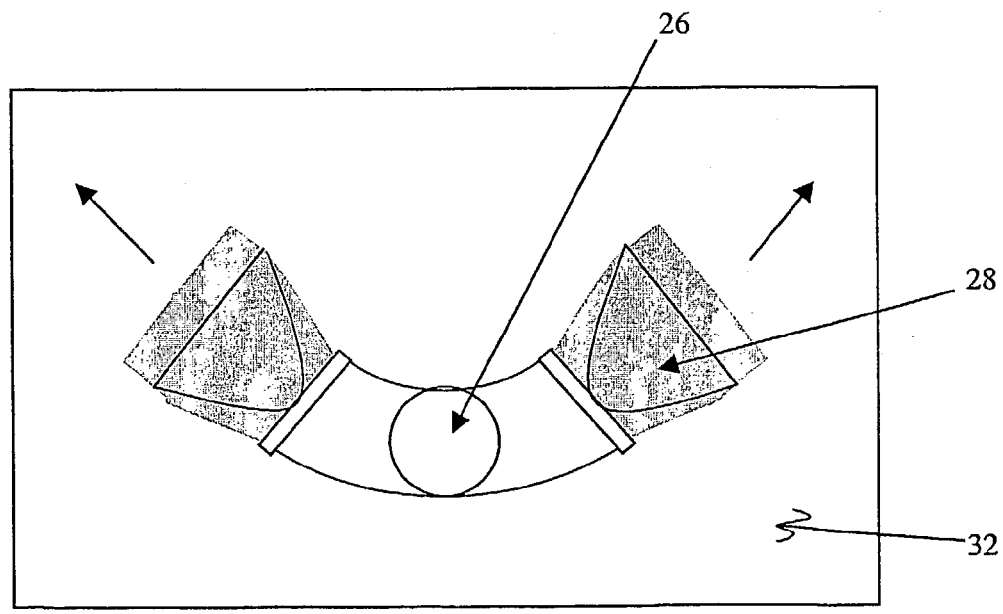
FIG. 6 shows a front elevational view of two inlet duckbill check valves having an upward orientation to facilitate fluid mixing.

FIG. 6 shows a pair of the preferred inlet duckbill check valves 28 as depicted in FIG. 2. Fluid flows from manifold 26 through inlet duckbill check valves 28 in the direction indicated by the arrows. FIG. 4 specifically shows inlet duckbill check valves 28 configured in an upward orientation relative to manifold 26. This orientation increases the mixing characteristics of the anti-stagnation apparatus 34 by directing fluid 32 upward to mix with fluid 32 already present in second fluid reservoir 20.

The anti-stagnation apparatus of the present invention can be connected to the existing inlet/outlet conduit of any conventional fluid reservoir, particularly those designed to store potable water. The anti-stagnation apparatus of the present invention can be connected to the inlet/outlet conduit of the conventional fluid reservoir system using a suitable mechanical or chemical means. By varying the number and location of inlet and outlet check valves, the shape of the manifold, and the orientation of the check valve relative to the manifold, an efficient anti-stagnation apparatus having little or no maintenance requirements may be created. Hence, the anti-stagnation apparatus of the present invention can be adapted for use in reservoirs of shallow depth as well as those that are quite deep. As an example, if a reservoir were a 10 foot diameter tank that was 100 feet high, with a single inlet/outlet conduit, the anti-stagnation apparatus of the present invention can be adapted to ensure that the fluid at the top, or at any other depth, does not stagnate. In other words, although the anti-stagnation apparatus is depicted in two dimensions, it can be configured to prevent fluid stagnation in three dimensions or in any area of a fluid reservoir.

Operation of the conventional fluid reservoir is achieved by the use of pumps and valves hydraulically connected with a single reservoir inlet/outlet conduit. Such single reservoir inlet/outlet operation apparatuses are typically in place at existing reservoirs. The reservoir operates based on the relative pressures between the fluid within the manifold and the fluid within the fluid reservoir. Thus, fluid flows into the fluid reservoir when the pressure within the manifold is greater and fluid flows out of the reservoir when the pressure within the reservoir is greater. The construction and non-return nature of the inlet and outlet check valves either permit or prevent the flow of fluids through them depending on their orientation and the hydraulic pressures which are placed upon them. It should be apparent to one skilled in the art that the deployment of the anti-stagnation apparatus of the present invention significantly increases the mixing of the fluids during the operation of a fluid reservoir while still being connected to a single inlet/outlet conduit.

Additionally, when, the anti-stagnation apparatus deploys duckbill check valves of elastomeric composition, maintenance costs related to the use of the anti-stagnation apparatus are drastically reduced. Any suitable elastomeric composition may be used in the duckbill check valves of the present invention. Examples of suitable elastomeric composition that can be used in the duckbill check valves include, but are not limited to, polyolefin elastomer, hydrocarbon rubber elastomer, chlorosulfonated polyethylene elastomer, chlorinated polyethylene elastomer, neoprene, neoprene polychloroprene, perfluoroelastomers, fluoroelastomers, silicone rubber, synthetic rubber, and natural rubber.

The present invention also provides a method for preventing stagnation in fluid reservoirs. The method of the present invention generally includes the steps of: introducing an influent fluid, typically potable water, process water, or wastewater, to a fluid-containing reservoir through an inlet/outlet conduit to one or more inlet check valves; regulating the flow of influent fluid through the inlet check valves such that the influent fluid flows from the inlet/outlet conduit through the inlet check valves and into the reservoir when filling is desired and preventing the flow of influent fluid when draining is desired; mixing the influent fluid into the fluid in the reservoir; directing the flow of fluid in the reservoir from the inlet check valves to one or more outlet check valves; regulating the flow of reservoir fluid through the outlet check valves such that the exiting fluid flows from the reservoir through the outlet check valves to the inlet/outlet conduit when draining is desired and preventing the flow of reservoir fluid through the outlet check valves when filling is desired; and expelling fluid from the inlet/outlet conduit.

In a preferred embodiment of the method for preventing stagnation in fluid reservoirs, the inlet check valves are a duckbill-type, oriented to regulate fluid flow as described above, and the outlet check valves are a duckbill-type, oriented to regulate fluid flow as described above. The preferred duckbill check valves preferably are of an elastomeric composition.

The present invention has been described with reference to specific details of particular embodiments thereof. Obvious modifications and alterations will occur to others upon reading and understanding the preceding detailed description. It is not intended that such details be regarded as limitations upon the scope of the invention except insofar as and to the extent that they are included in the accompanying claims.

We claim:

1. An apparatus for preventing stagnation in a fluid reservoir comprising:
   (a) an inlet/outlet conduit through which fluid enters and exits the fluid reservoir;
   (b) a manifold which sequentially conveys the fluid to and from the inlet/outlet conduit;
   (c) a plurality of hydraulically parallel inlet duckbill check valves;
   (d) at least one outlet check valve for draining fluid from the reservoir; and
   (e) wherein a horizontal surface area of the fluid reservoir as compared to a height of the fluid reservoir is large and wherein the manifold is approximately in a plane parallel to the fluid surface.

2. The apparatus of claim 1, wherein the inlet check valves are oriented such that fluid flows from the manifold to the reservoir during reservoir filling and fluid flow is prevented during reservoir draining and the at least one outlet check valve is positioned such that fluid flows within the reservoir in the general direction of from the inlet check valves to the outlet check valve, the outlet check valve being oriented such that the fluid flows from the reservoir into the manifold during reservoir draining, and fluid flow is prevented during reservoir filling.

3. The apparatus of claim 1, wherein the inlet duckbill check valves have an elastomeric composition.

4. The apparatus of claim 3, wherein the elastomeric composition of the inlet duckbill check valves is one or more selected from the group consisting of polyolefin elastomer, hydrocarbon rubber elastomer, chlorosulfonated polyethylene elastomer, chlorinated polyethylene elastomer, neoprene, neoprene polychloroprene, perfluoroelastomers, fluoroelastomers, silicone rubber, synthetic rubber, and natural rubber.

5. The apparatus of claim 1, wherein the at least one outlet check valve is a duckbill check valve.

6. The apparatus of claim 5, wherein the outlet duckbill check valve has an elastomeric composition.

7. The apparatus of claim 6, wherein the elastomeric composition of the outlet duckbill check valve is one or more selected from the group consisting of polyolefin elastomer, hydrocarbon rubber elastomer, chlorosulfonated polyethylene elastomer, chlorinated polyethylene elastomer, neoprene polychloroprene, perfluoroelastomers, fluoroelastomers, silicone rubber, synthetic rubber, and natural rubber.

8. The apparatus of claim 1, connected to a pre-existing inlet/outlet conduit of a fluid reservoir.

9. The apparatus of claim 8, wherein the fluid reservoir contains a fluid selected from the group consisting of potable water, process water, and wastewater.

10. An apparatus for preventing stagnation in a fluid reservoir comprising:
    (a) an inlet/outlet conduit through which fluid sequentially enters and exits the fluid reservoir;
    (b) a manifold which sequentially conveys the fluid to and from the inlet/outlet conduit;
    (c) at least one inlet check valve positioned in a localized area of the manifold said inlet check valve configured so that it will discharge directly into said fluid reservoir;
    (d) at least one outlet check valve positioned in a localized area of the manifold which is separate from the localized area of the manifold where the at least one inlet check valve is positioned; and
    (e) wherein the fluid reservoir has a diameter and a height, the ratio of the diameter to the height is greater than 1, and the apparatus for preventing stagnation is in a horizontal configuration, wherein the manifold is approximately in a plane parallel to the fluid surface.

11. The apparatus of claim 10, wherein said at least one inlet check valve is a duckbill check valve.

12. An apparatus for preventing stagnation in a fluid reservoir comprising:
    (a) an inlet/outlet conduit through which fluid sequentially enters and exits the fluid reservoir;
    (b) a manifold which sequentially conveys the fluid to and from the inlet/outlet conduit;
    (c) at least one inlet check valve positioned in a localized area of the manifold said inlet check valve configured so that it will discharge directly into said fluid reservoir;
    (d) at least one outlet check valve positioned in a localized area of the manifold which is separate from the localized area of the manifold where the at least one inlet check valve is positioned; and
    (e) wherein the fluid reservoir has a diameter and a height, the ratio of the diameter to the height is less than 1 and the apparatus for preventing stagnation is in a vertical configuration wherein the manifold is approximately in a plane perpendicular to the fluid surface, the at least one inlet check valve is located in an upper half of the fluid reservoir, and the at least one outlet check valve is located in a lower half of the fluid reservoir.

13. The apparatus of claim 12, wherein said at least one inlet check valve is a duckbill check valve.

14. An apparatus for preventing stagnation in a fluid reservoir comprising:
    (a) an inlet/outlet conduit through which fluid sequentially enters and exits the fluid reservoir:
    (b) a manifold which sequentially conveys the fluid to and from the inlet/outlet conduit;
    (c) a plurality of hydraulically parallel inlet duckbill check valves;
    (d) at least one outlet check valve for draining fluid from the reservoir; and
    (e) wherein a horizontal surface area of the fluid reservoir is small as compared to a height of the fluid reservoir and wherein the manifold is approximately in a plane perpendicular to the fluid surface, the inlet check valves are located in an upper half of the fluid reservoir, and the at least one outlet check valve is located in a lower half of the fluid reservoir.

15. An apparatus for preventing stagnation in a fluid reservoir comprising:
    (a) an inlet/outlet conduit through which fluid sequentially enters and exists the fluid reservoir;
    (b) a manifold which sequentially conveys the fluid to and from the inlet/outlet conduit;
    (c) at least one inlet check valve position in a localized area of the manifold said inlet check valve configured so that it will discharge directly into said fluid reservoir;
    (d) at least one outlet check valve positioned in a localized area of the manifold which is separate from the localized area of the manifold where the at least one inlet check valve is positioned; and
    (e) wherein a horizontal service area of the fluid reservoir as compared to a height of the fluid reservoir is small and wherein the manifold is approximately in a plane perpendicular to the fluid surface.

* * * * *

UNITED STATES PATENT AND TRADEMARK OFFICE
CERTIFICATE OF CORRECTION

PATENT NO. : 7,104,279 B2 Page 1 of 1
APPLICATION NO. : 10/296001
DATED : September 12, 2006
INVENTOR(S) : Raftis et al.

It is certified that error appears in the above-identified patent and that said Letters Patent is hereby corrected as shown below:

Column 7, Line 7, Claim 1, "fluid enters" should read -- fluid sequentially enters --

Signed and Sealed this

Sixth Day of February, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,104,279 B2 |
| APPLICATION NO. | : 10/296001 |
| DATED | : September 12, 2006 |
| INVENTOR(S) | : Spiros G. Raftis et al. |

It is certified that error appears in the above-identified patent and that said Letters Patent is hereby corrected as shown below:

Col. 1, line 4; Please insert;
The first sentence of the specification should include the following:
--This appliation claims the benefit of U.S. Provisional Patent Application No. 60/207,783, filed May 30, 2000.--

Signed and Sealed this

Fourteenth Day of August, 2007

JON W. DUDAS
*Director of the United States Patent and Trademark Office*